United States Patent
Fisher, Jr.

(10) Patent No.: US 6,322,146 B1
(45) Date of Patent: Nov. 27, 2001

(54) LINEAR RECLINER WITH PLASTIC HOUSING

(75) Inventor: Alfred J. Fisher, Jr., Gross Pointe, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/503,989

(22) Filed: Feb. 14, 2000

(51) Int. Cl.[7] .................................................. B60N 2/22
(52) U.S. Cl. ............................ 297/362.14; 297/362.11; 74/89.14; 74/606 R
(58) Field of Search ........................ 297/362.11, 362.12, 297/362.14; 74/89.14, 606 R

(56) References Cited

U.S. PATENT DOCUMENTS

| | | | |
|---|---|---|---|
| 4,802,374 | * | 2/1989 | Hamelin et al. ............... 74/89.14 |
| 4,898,424 | | 2/1990 | Bell . |
| 4,962,963 | | 10/1990 | Robinson . |
| 5,052,752 | | 10/1991 | Robinson . |
| 5,150,872 | * | 9/1992 | Isomura ........................ 74/89.14 |
| 5,199,764 | | 4/1993 | Robinson ...................... 74/89.14 |
| 5,564,308 | * | 10/1996 | Hoshikawa et al. ........... 74/89.14 |
| 5,718,482 | | 2/1998 | Robinson . |
| 5,823,622 | | 10/1998 | Fisher, IV et al. . |
| 5,947,560 | | 9/1999 | Chen . |
| 5,979,986 | | 11/1999 | Pejathaya . |
| 5,984,412 | | 11/1999 | Magyar . |
| 6,039,399 | | 3/2000 | Whalen et al. . |

\* cited by examiner

*Primary Examiner*—Peter R. Brown
(74) *Attorney, Agent, or Firm*—Harness, Dickey & Pierce, P.L.C.

(57) ABSTRACT

A seat recliner that controllably adjusts the angular position of a seat back relative to a seat base structure and is responsive to remote actuation by an operator. The recliner includes a driven mechanism adapted to be connected to the seat back, a drive mechanism rotatable in a first and second direction, and a transmission assembly operably interconnecting the drive mechanism and the driven mechanism. The transmission assembly includes a gear retainer assembly and a mounting assembly. The mounting assembly is adapted to be connected to one of the seat base and seat back. The gear retainer assembly includes a gear housing formed of a polymeric material and adapted to accommodate the drive and driven mechanisms for operative interconnection, whereby rotation of a transmission rod in the first or second direction causes a recliner rod to move relative to the housing in a corresponding first and second linear direction.

26 Claims, 4 Drawing Sheets

LINEAR RECLINER WITH PLASTIC HOUSING

BACKGROUND OF THE INVENTION

The present invention relates to a seat recliner and, in particular, to a powered seat-recliner system having a lightweight plastic transmission housing with high load-carrying capacity.

In a conventional power linear seat-recliner system, a central motor drives a single or pair of actuator cables that, in turn, plug into gear nut(s) that engage threaded shaft(s) in transmission housings on opposite lateral sides of the seat. The threaded shafts, which reciprocate linearly, are secured to a pivoting mechanism that provides seat back reclining adjustment proportional to the linear motion of the threaded shaft.

Typically, transmission housings are cast aluminum, which is relatively expensive and suffers from varying dimensions as the die-cast mold wears. That is, as a mold is repeatedly used to cast aluminum transmission housings, wear on the mold through repeated use eventually skews the dimensions of the die cast parts. Because the transmission housing is a precision part, such wear causes the part to fail to meet required tolerances, often requiring that tolerances be met by adding thrust bearings of varying widths. Further, aluminum is a relatively expensive material from which to make transmission housings.

Notwithstanding the problems associated with mold wear, cast aluminum recliner housings have achieved widespread acceptance due, at least in part, to the ability of the aluminum material and cast housing to withstand the significant forces present during use. The magnitude of these forces, in conjunction with the need to insure that the transmission housing is robust in construction and performance, have dissuaded acceptance of transmission housings formed of alternative materials. However, a need remains for a less expensive and lightweight transmission housing that meets or exceeds the operational capabilities of accepted cast aluminum housings.

SUMMARY OF THE INVENTION

In view of the above, a first object of the present invention is to provide a transmission housing having a mounting assembly and gear housing that is lightweight yet capable of withstanding the forces to which linear recliner assemblies are subjected.

Another object of the present invention is to provide a gear housing for a linear recliner assembly that is fabricated of a lightweight polymeric material and configured to accommodate and operatively interconnect a recliner drive mechanism and a driven mechanism such as the recliner rod.

Yet another object of the present invention is to provide a transmission housing, including a mounting assembly and gear housing, that occupies a relatively small package area and is durable and reliable in operation.

Accordingly, the illustrated embodiment of the present invention includes a linear recliner assembly having a transmission housing that includes a U-shaped outer plate overlapping a U-shaped inner plate with a gear retainer housing therebetween. The gear retainer housing is fabricated from a plastic material, preferably nylon, and provides a lightweight, high-load carrying capacity housing in a small package and at a relatively low cost. The assembled transmission housing receives a transmission rod having a worm gear for linearly driving a threaded recliner rod. A user-actuable motor rotates the transmission rod within the transmission housing, which thereby imparts linear movement to the recliner rod through the transmission housing for providing reclining adjustment of a seat back relative to a seat cushion.

BRIEF DESCRIPTION OF THE DRAWINGS

The present invention will become more fully understood from the detailed description given here below and the accompanying drawings wherein.

DETAILED DESCRIPTION OF THE PREFERRED EMBODIMENT

Figure 1:
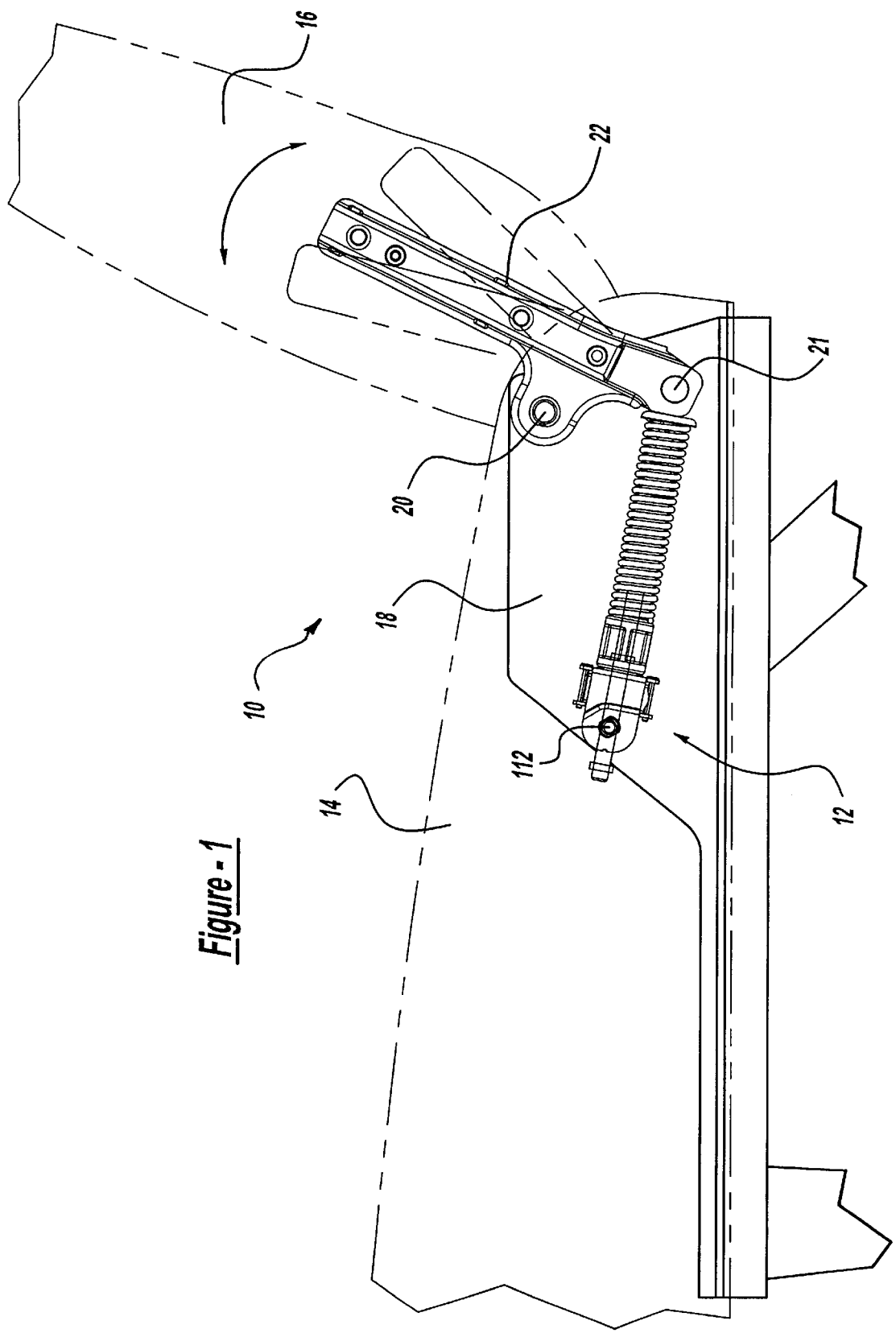
FIG. 1 is a side view of a seat assembly of the present invention with the seat back and seat cushion shown in phantom, illustrating the operational association between an adjustable linear seat recliner assembly and a common seat structure.

Referring now to the drawings, FIG. 1 illustrates a vehicle seat assembly 10 incorporating a linear recliner assembly in accordance with the present invention. The seat assembly 10 is of the type conventionally installed in the front passenger compartment of a motor vehicle and comprises a seat cushion 14 and a seat back 16 functionally interconnected to permit the angle therebetween to be controllably varied by an adjustable linear recliner assembly 12. The seat back 16 is coupled to the seat cushion 14 in a manner generally known in the art such as through a recliner structure 22 for pivotal movement about an axis defined by a pivot pin 20. The pin 20, or other conventional fastener, rotatably secures the recliner structure 22 to a seat base structure 18. The reclining structure 22 is preferably a unitarily formed metal plate suitably configured to provide stable pivotal motion.

Figure 2:
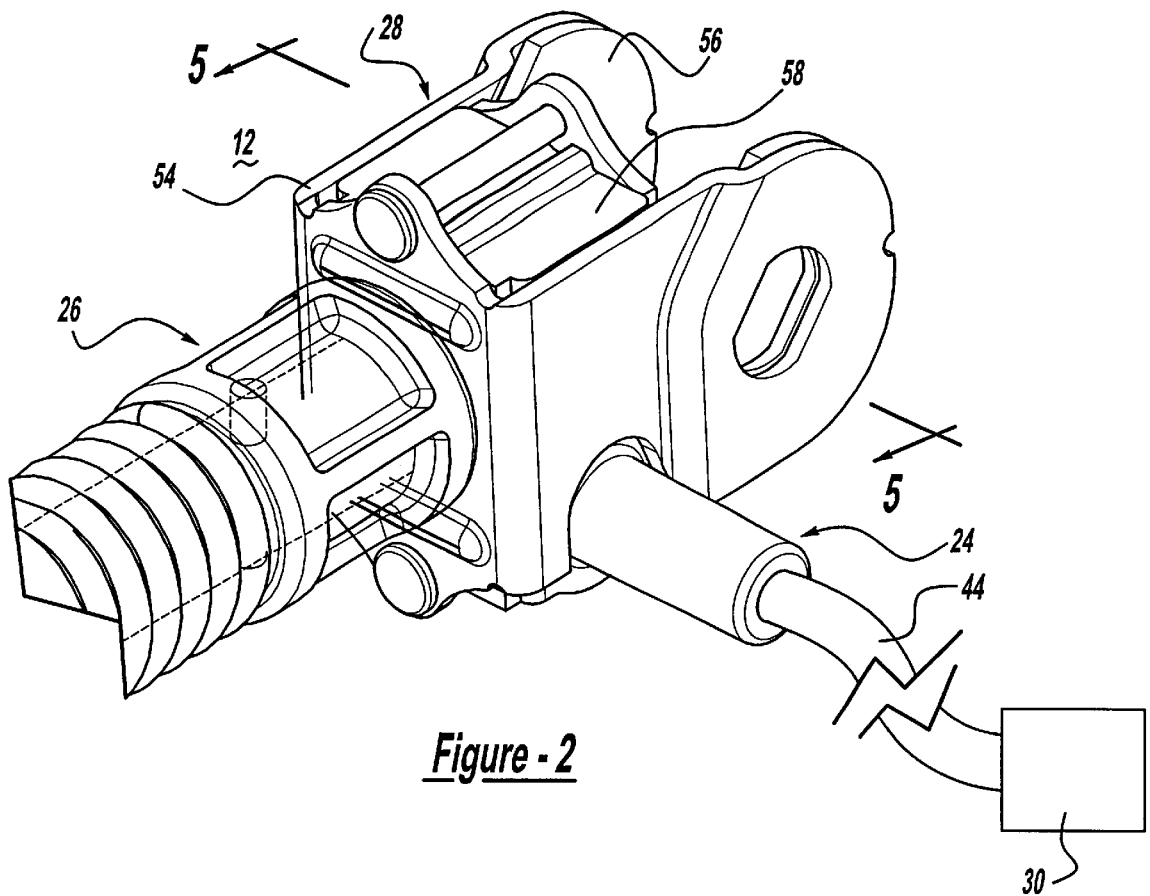
FIG. 2 is a perspective view of the adjustable linear seat recliner assembly shown in FIG. 1.

The linear recliner assembly 12 adjustably controls reclining movement of the seat back 16 relative to the seat cushion 14. With reference to FIG. 2, the power linear recliner assembly 12 preferably includes a drive mechanism 24, a driven mechanism 26, and a transmission assembly 28 for supporting and inter-engaging the drive mechanism 24 and the driven mechanism 26. As will be described in more detail below, the drive mechanism 24 is actuated by a direct drive motor 30 for producing linear reciprocal motion of driven mechanism 26. Actuation of the direct drive motor 30 is provided by a position control switch (not shown) provided within the passenger compartment in close proximity to seat assembly 10 to permit the vehicle operator to selectively recline seat back 16 relative to seat cushion 14 in an upright or reclined direction through a range of angular positions. As is conventional for power recliner assemblies, the motor 30 drives a pair of actuator cables that, in turn, plug into gear nuts of drive mechanisms for recliner assemblies 12 disposed on each side of the seat assembly 10. Such a system is described in U.S. Pat. No. 5,199,764, hereby incorporated in this description by reference. For simplicity, only one linear recliner assembly 12 will be described, with the understanding that the linear recliner assembly 12 can be positioned on each side of the seat assembly 10 if required.

Figure 4:
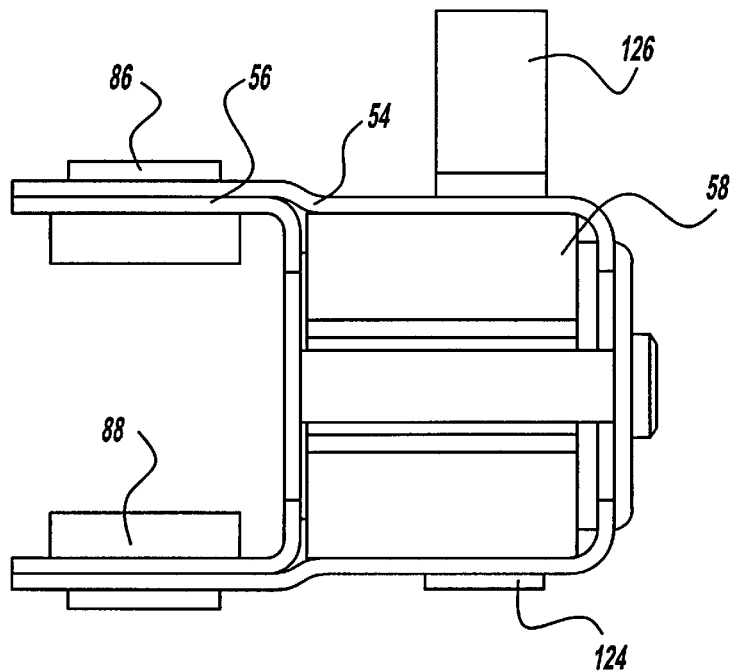
FIG. 4 is a partial top view of the adjustable linear seat recliner assembly shown in FIG. 2.
Figure 5:
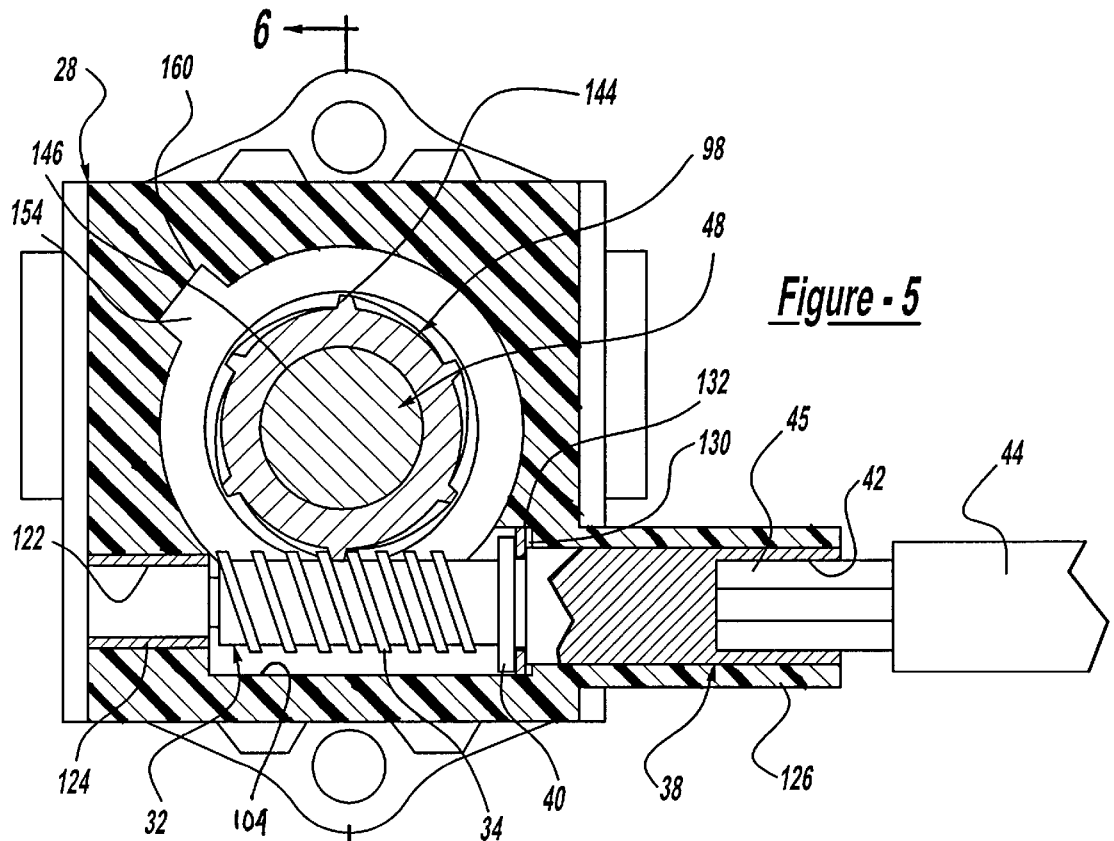
FIG. 5 is a partial sectional view of the adjustable linear seat recliner assembly taken along line 5—5 of FIG. 2.

Referring now to FIGS. 2–5, the drive mechanism 24, the driven mechanism 26, and the transmission assembly 28 will be described in more detail. Drive mechanism 24 includes the motor 30 drivingly connected by a drive cable 44 to a transmission rod 32, which is journalled for rotation in the transmission assembly 28. The transmission rod 32 includes a worm gear 34 formed coaxially thereon adjacent a first end 36 thereof. At an opposite second end 38, the transmission rod 32 is generally smooth, and a seat ring 40 is formed coaxially about the transmission rod 32 between the worm gear 34 and the smooth second end 38. The second end 38 also includes an end face having a recess 42 for receiving the cable 44 that is rotationally driven by direct drive motor 30. As is best illustrated in FIG. 5, the recess 42 is preferably square, and a male end 45 of cable 44 is complementarily square for driving inter-engagement. When assembled, the transmission rod 32 of the drive mechanism 24 is mounted within the transmission assembly 28.

Figure 3:
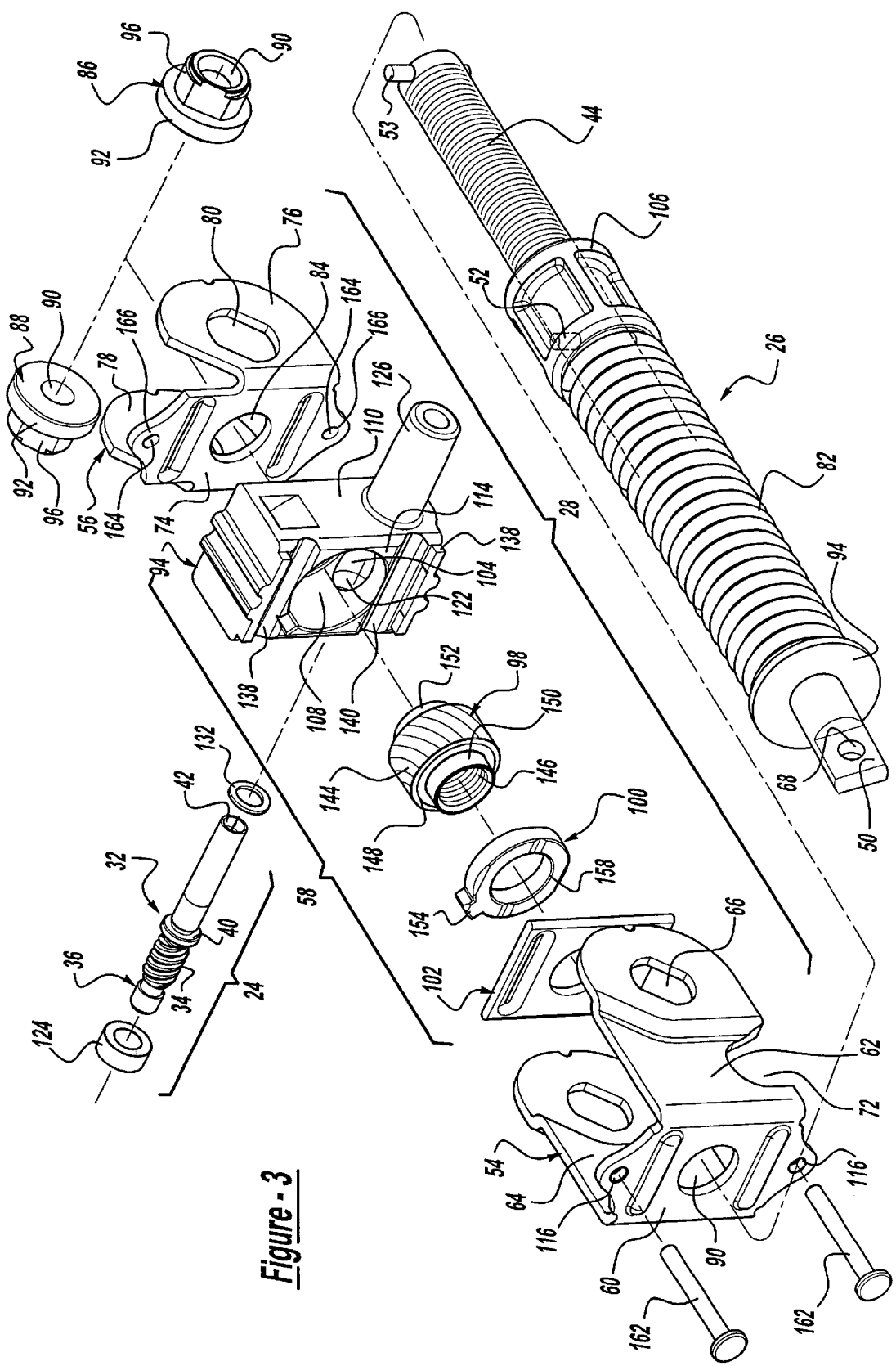
FIG. 3 is an exploded perspective view of the adjustable linear seat recliner assembly shown in FIG. 2.

As is best illustrated in FIG. 3, the driven mechanism 26 includes an elongated threaded recliner rod 48 including a first end defining a flat surface 50 having an aperture 68. The body of the recliner rod 48 coaxially mounts a spring 82 between a washer 93 and a sleeve 106. A retention pin 52, which prevents the recliner rod's forward withdrawal from transmission assembly 28 while providing a full rearward stop of seat back 16, extends laterally through an intermediate portion of the body of the recliner rod 48. An opposite second end of the recliner rod 48 also includes a retention pin 53, which prevents rearward withdrawal of the rod 48 from transmission assembly 28 while providing a full forward stop of seat back 16. Recliner rod 48 further includes a threaded section 46 between the pins 52, 53. As is described in greater detail below, threaded section 46 is received by the transmission assembly 28 for driving inter-engagement with the worm gear 34 of the drive mechanism's transmission rod 32. In this way, the recliner rod 48 axially moves through transmission assembly 28 upon actuation of direct drive motor 30 to provide the desired linear motion. The recliner structure 22 is connected to the elongated threaded rod 48 through a fastener 21 received in an aperture in a lower portion of the recliner structure 22 and an aperture 68 the flat surface 50 of threaded rod 48, as best shown in FIG. 1. Thus, linear movement of threaded rod 48 is translated into angular movement of the seat back 16.

With reference to FIG. 3, the transmission assembly 28 generally includes a mounting assembly having an outer plate 54 and an inner plate 56 that are cooperatively configured to accommodate a gear retainer assembly 58 therebetween and to securely connect the transmission assembly 28 to one of the seat back and seat cushion. The inner and outer plates 54, 56 are preferably a high strength stamped metal or high carbon such as SAE 1050-1055 steel. When assembled, as shown in FIG. 2, the inner and outer plates 54, 56 house the gear retainer assembly 58 in a high load-carrying assembly having a relatively small package area. Further, the inner and outer plates 54, 56 securely mount the transmission assembly 28 to a vehicle structure, such as seat base structure 18. As generally discussed above, the gear retainer assembly 58 interconnects the transmission rod 32 and the threaded rod 48 for angularly positioning the seat back 16 relative to the seat cushion 14.

The outer plate 54 is a generally U-shaped frame having a central portion 60 joining first and second opposed legs 62, 64. The first and second legs 62, 64 have aligned apertures 66 therethrough for alignment with similar apertures through the inner plate 56. The central portion 60 of the outer plate 54 includes an aperture 70 to allow the threaded recliner rod 48 access to the gear retainer assembly 58. The central portion also includes a pair of apertures 116, disposed in tabs 118, extending in opposite directions therefrom. The apertures 116 receive fasteners 162 to secure the inner and outer plates 54, 56 together. Also, an arcuate notch 72 formed in an edge of each of first and second legs 62, 64 accommodates the transmission rod 32, which extends into the gear retainer assembly 58.

The inner plate 56 is shaped similar to outer plate 54, and includes a central portion 74 flanked by first and second opposed legs 76, 78. The first and second opposed legs 76, 78 have aligned apertures 80 therethrough for alignment with the apertures 66 of the outer plate 54 when assembled. Also, the central portion 74 includes an aperture 84 therethrough that is alignable with aperture 70 to accommodate axial movement of the threaded rod 48 through the gear retainer assembly 58. The central portion also includes a pair of threaded apertures 164 disposed in tabs 166 extending in opposite directions therefrom. The threaded apertures 164 engage the fasteners 162 received through apertures 116 in tabs 118 of outer plate 54 to secure the inner and outer plates 54, 56 together.

When assembled, the first and second legs 62, 64 of the outer plate 54 overlap the first and second legs 76, 78, respectively, of the inner plate 56, as illustrated in FIG. 2. The gear retainer assembly 58 is sandwiched between the central portions 60, 74 of the outer plate 54 and the inner plate 56, respectively. More particularly, during assembly, the inner plate 56 is pressed toward the outer plate 54 to compress a doubler plate 102 against a thrust bearing 100 which, in turn, is pressed against the helical nut gear 98 to limit play between the nut gear and thrust bearing. Once properly assembled, the apertures 66 of the outer plate 54 are aligned with the apertures 80 of the inner plate 56 to permit insertion of trunion bushing 86 (FIG. 4).

The mounting assembly also includes a trunion bushing 88 mounted in the aligned apertures 66, 80 of the second legs 64, 78 of the outer plate 54 and the inner plate 56, respectively. The trunion bushings 86, 88 help secure the outer plate 54 to the inner plate 56, thereby securing the gear retainer assembly 58 therebetween, and further provide mounts for securing the transmission assembly 28 to a vehicle mount, such as seat base structure 18. More specifically, each trunion bushing 86, 88 includes an aperture 90 for receiving a fastener 112 mounting the transmission assembly 28 to the vehicle mount, and preferably to the seat base structure 18 of seat assembly 10. Externally, each trunion bushing 86, 88 includes a collar 92 disposed coaxially with threaded aperture 90 (FIG. 3). Adjacent to the collar 92 is a sleeve 96, also disposed coaxially to the threaded aperture 90, but of smaller outer diameter relative the collar 92. The sleeve 96 of each trunion bushing 86, 88 extends through the respective aligned apertures 66, 80 of first and second legs 62, 76 and 64, 78 of inner and outer plates 54, 56, respectively, and is shaped complimentarily to the apertures to prevent rotation therein. The collar 92 prevents withdrawal of the trunion bushings 86, 88 from the respective aligned apertures 66, 80 when the transmission assembly 28 is secured to a vehicle mount.

The structure and function of the gear retainer assembly 58 will now be described with particular reference to FIG. 3. Gear retainer assembly 58 includes gear housing 94, helical nut gear 98, thrust bearing 100, and doubler plate 102. The gear housing 94 includes a drive mechanism passage 104, a gear cavity 108, and a driven mechanism passage 110 that each communicate with one another to allow the operative interconnection of the drive and driven mechanisms 24 and 26. More particularly, drive mechanism passage 104 is configured to receive and support the transmission rod 32 while the driven mechanism passage 110 is spaced from and generally perpendicular to passage 104 to accommodate the threaded segment 46 of recliner rod 48. Gear cavity 108 extends radially outward from the axis of driven mechanism passage 110 to communicate with drive mechanism passage 104 and accommodate the helical nut gear 98 and the thrust bearing 100 as shown. The gear housing 94 is preferably formed from a polymeric material and, more preferably an injection-molded plastic. Most preferably, the plastic material is nylon. However, it should be appreciated that a variety of other high compressive strength, toughness and wear resistance materials generally known in the art may be used to form the housing 94. By formulating the gear housing 94 of a polymeric material the overall weight of the linear recliner assembly 12 is significantly reduced. Moreover, the configuration of the respective passages and cavities within the gear housing as well as the lightweight yet high strength provided by the plates 54 and 56 securely interconnect the operative components of the transmission assembly 28 as well as couple the linear recliner assembly 12 to the seat.

While the specific configuration of the gear housing 94 may be varied to accommodate different operative interconnections of the drive and driven members, the illustrated embodiment (FIG. 5) includes an opening 122 which provides access to the drive mechanism passage 104 for the transmission rod 32 and threadedly receives a thrust cap 124 to securely mount the transmission rod 32 within the housing 94. The drive mechanism passage 104, which is axially aligned with the opening 122, is capped by a tubular extension 126 for coaxially receiving the smooth second end 38 of transmission rod 32. The walls of the drive mechanism passage 104 rotationally support the smooth second end 38 of transmission rod 32. As best shown in FIG. 5, the drive mechanism passage 104 includes a seat 130 for seat ring 40 of the transmission rod 32. More specifically, a thrust washer 132 is disposed between the seat 130 and the seat ring 40 of the transmission rod 32. Thus, when assembled, seat ring 40 and thrust washer 132 are seated against seat 130, while thrust cap 124 is threaded in threaded opening 122, whereby the transmission rod 32 is properly positioned and rotationally supported within gear retainer assembly 58.

Disposed perpendicularly through the gear retainer assembly 58 is a recliner rod passage for accommodating the linear displacement of the recliner 48 through the gear retainer assembly 58. The recliner rod passage is defined by a threaded opening 134 through helical nut gear 98, driven mechanism passage 110, and the coaxially aligned apertures in the thrust bearing 100, and plates 102, 54 and 56.

Figure 6:
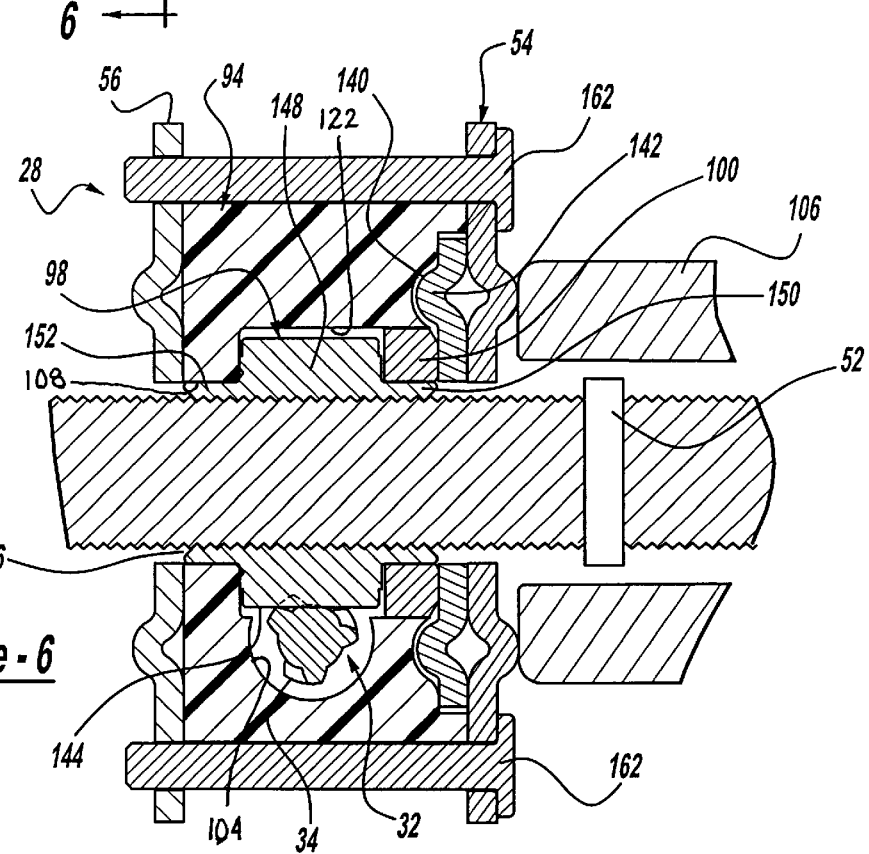
FIG. 6 is a sectional view of the adjustable linear seat recliner assembly taken along line 6—6 of FIG. 5.

In the preferred embodiment, the gear housing 94, and particularly the side walls thereof, are configured to accommodate the thrust bearing 100, doubler plate 102, and central portions 60 and 74 of the inner and outer plates to ensure proper alignment of these elements during assembly. More particularly, a broad side 114 of gear housing 94 includes a rectangular recess between ledges 138. The rectangular recess is shaped complimentary to the doubler plate 102 whereby the doubler plate 102 seats between, and is supported by, the adjacent ledges 138. The doubler plate 102 is secured in recess 136 by the assembled inner and outer plates 54 and 56 and maintains the helical nut gear 98 and its coaxially flanking thrust bearing 100 in proper position within the gear retainer assembly 58. Further, the broad side 114 includes a pair of opposed locating recesses 140, disposed adjacent the ledges 138 as shown in FIG. 6. Once the outer plate 54, inner plate 56, and gear retainer assembly 58 are assembled, the recesses 140 locate the doubler plate 102 relative the gear retainer housing 94 by registering complimentarily shaped shoulders 142 of the doubler plate 102 in the locating recesses 140. Thus, once assembled, the thrust bearing 100 and helical gear nut 98 cannot be displaced from the gear cavity 108.

As best shown in FIGS. 3, 5 and 6, an outer surface of the helical nut gear 98 is drivingly engages with the worm gear 34 of the transmission rod 32 and an interior surface of nut 98 drivingly engages the elongated threaded rod 48. The helical nut gear 98 includes a helical gear 144 on its outer diameter surface and a thread 146 along its inner diameter surface. The inner and outer diameter surfaces are coaxial, and the helical gear 144 is formed about a raised central circumferential portion 148 flanked axially by sleeves 150, 152. The thrust bearing 100 is coaxially mounted on the sleeve 150 on one side of the raised central circumferential portion 148 of the helical nut gear 98, while the sleeve 152 is received within a bore 156 formed within gear cavity 108, such that the helical nut gear 98 is disposed in a proper position for rotation within the gear retainer assembly 58. The thrust bearing 100 is a ring-shaped body 158 having a tab 154 extending diametrically from an outer diameter surface thereof. Thus, the thrust bearing 100 is keyed for reception within the gear retainer assembly 58, whereby the tab 154 mounts in a notch 160 to prevent rotation on the thrust bearing 100 with the helical nut gear 98, but permitting the helical nut gear 98 to rotate within the gear retainer assembly 58 while it is supported through its sleeves 150, 152 upon an inner diameter portion of the thrust bearing 100 and the bore 156, respectively. When fully assembled, the doubler plate 102 axially disposes the thrust bearing 100 about sleeve 150 between the raised central circumferential portion 148 and the doubler plate 102 itself. Further, the doubler plate 102 is held in position abutting the thrust bearing 100 by the central portion 60 of the outer plate 54.

In operation, the vehicle operator remotely actuates the motor 30 to rotate the actuator cable 44 in either direction so as to generate the desired seat back adjustment angle. Rotation of the drive cable 44 by motor 30 in one direction provides backward reclining movement of seat back 16, while opposite rotation of motor 30 provides forward upright motion of seat back 16. The threaded rod 48 is securely fastened to the recliner structure 22 via fastener 21 through aligned apertures in the flat surface 50 of the threaded rod 48 and a lower end of the recliner structure 22. Linear motion of threaded rod 48 is thereby changed into pivotable motion of seat back 16 as the recliner structure 22, which mounts the seat back 16, pivots about the axle 20. It is contemplated that other pivotable connections between the threaded rod 48 and seat back 16 can be utilized based on the structural configuration of seat assembly 10. The power recliner assembly 12 permits infinite adjustment of seat back 16 relative to the seat cushion 14. The speed of tilt-back adjustment is predicated on the gear ratio selected for use in transmission assembly 28. Thus, the linear recliner assembly 12 can be designed for each specific vehicle application with relative ease.

In summary, rotation of the motor 30 in either direction causes rotation of the transmission rod 32, which, through the worm gear 34 acting on the helical nut gear 98, causes rotation of the elongated thread rod 48 such that the rod 48 moves linearly through the gear retainer assembly 58, causing the lower portion of the recliner structure 22 to move in a corresponding direction, which forces the seat back 16, mounted to an upper portion of the recliner structure 22, to rotate relative the seat cushion 14 in an opposite direction as the recliner structure 22 rotates about the intermediately disposed axle 20. In this way, the angular position of the seat back 16 is infinitely adjustable relative the seat cushion 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear seat recliner for controllably adjusting the angular position of a seat back relative to a seat base, comprising:
    a driven mechanism including a recliner rod adapted to be coupled to one of the seat back and seat base;
    a drive mechanism;
    a transmission assembly operably interconnecting said drive mechanism and said driven mechanism, said transmission assembly including a gear retainer assembly and a mounting assembly, said mounting assembly including a second plate nesting within a first plate and securing said gear retainer assembly therebetween, and coupling said gear retainer assembly to the other of the seat back and seat base, said gear retainer assembly including a gear housing formed of a polymeric material.

2. The linear seat recliner of claim 1 wherein said gear housing includes a drive mechanism passage, a driven mechanism passage, and a gear cavity, said drive mechanism passage extending transverse to said driven mechanism passage, said gear cavity communicating with said drive mechanism passage and said driven mechanism passage.

3. The linear seat recliner of claim 2 wherein each of said first and second plates having a central portion and a pair of legs extending from said central portion for aligning said first and second plates, said first plate coupled to said second plate to define a cavity between said central portions of said first and second plates, said gear housing disposed within said cavity.

4. The linear seat recliner of claim 3 wherein said driven mechanism is disposed in said driven mechanism passage and said drive mechanism is disposed in said drive mechanism passage and wherein said gear retainer assembly further includes a helical nut gear, a thrust bearing, and a doubler plate, said helical nut gear disposed in said gear cavity in operative engagement with said drive mechanism and said driven mechanism, said thrust bearing operatively engaging said helical nut gear, said doubler plate operatively engaging said thrust bearing, said first and second plates compressing said doubler plate against said thrust bearing to limit play within the transmission assembly during operation.

5. The linear seat recliner of claim 4 wherein said helical nut gear includes a helical gear on an outer surface thereof and a thread on an inner surface thereof, said driven mechanism includes a rod having a threaded segment extending into said driven mechanism passage and into operative engagement with said inner diameter of said helical nut gear, said drive mechanism including a second rod having worm gear received in said driven mechanism passage, said worm gear in meshing engagement with said outer surface of said helical nut gear to rotate said helical gear when said drive mechanism is rotated.

6. The linear seat recliner of claim 4 wherein said gear housing includes a side face and a recess extending inwardly from said side face, said recess bounded by a pair of ledges, said doubler plate disposed in said recess and between said pair of ledges.

7. The linear seat recliner of claim 3 wherein the first plate at least partially overlaps said gear retainer assembly and said second plate.

8. The linear seat recliner of claim 2 wherein said gear housing receives said drive mechanism and said driven mechanism for operative interconnection, whereby rotation of said driven mechanism causes linear movement of said driven mechanism relative to said housing.

9. The linear seat recliner of claim 1 wherein said polymeric material is an injected-molded plastic material.

10. The linear seat recliner of claim 1 wherein said polymeric material is nylon.

11. A vehicle seat comprising:
    a seat base;
    a seat back coupled for pivotable movement relative to the seat base; and
    a linear seat recliner including a drive mechanism, a driven mechanism and a transmission assembly operably interconnecting the drive mechanism and the driven mechanism, said transmission assembly including a gear retainer assembly and a mounting assembly, said mounting assembly including a second plate nesting within a first plate and securing said gear retainer assembly therebetween, and coupled to one of the seat back and seat base, said driven mechanism coupled to the other of the seat back and seat base, said gear retainer assembly including a gear housing formed of a polymeric material.

12. The vehicle seat of claim 11 wherein said gear housing includes a drive mechanism passage, a driven mechanism passage, and a gear cavity, said drive mechanism passage extending transverse to said driven mechanism passage, said gear cavity communicating with said drive mechanism passage and said driven mechanism passage.

13. The vehicle seat of claim 12 wherein each of said first and second plates having a central portion and a pair of legs aligning said first and second plates extending from said central portion, said first plate coupled to said second plate to define a cavity between said central portions of said first and second plates, said gear housing disposed within said cavity.

14. The vehicle seat of claim 13 wherein said driven mechanism is disposed in said driven mechanism passage and said drive mechanism is disposed in said drive mechanism passage and wherein said gear retainer assembly further includes a helical nut gear, a thrust bearing, and a doubler plate, said helical nut gear disposed in said gear cavity in operative engagement with said drive mechanism and said driven mechanism, said thrust bearing operatively engaging said helical nut gear, said doubler plate operatively engaging said thrust bearing, said first and second plates compressing said doubler plate against said thrust bearing to limit play within the transmission assembly during operation.

15. The vehicle seat of claim 14 wherein said helical nut gear includes a helical gear on an outer surface thereof and a thread on an inner surface thereof, said driven mechanism includes a rod having a threaded segment extending into said driven mechanism passage and into operative engagement with said inner diameter of said helical nut gear, said drive mechanism including a second rod having a worm gear received in said driven mechanism passage, said worm gear in meshing engagement with said outer surface of said helical nut gear to rotate said helical gear when said drive mechanism is rotated.

16. The vehicle seat of claim 14 wherein said gear housing includes a side face and a recess extending inwardly from said side face, said recess bounded by a pair of ledges, said doubler plate disposed in said recess and between said pair of ledges.

17. The vehicle seat of claim 13 wherein the first plate at least partially overlaps said gear retainer assembly and said second plate.

18. The vehicle seat of claim 12 wherein said gear housing receives said drive mechanism and said driven mechanism for operative interconnection, whereby rotation of said driven mechanism causes linear movement of said driven mechanism relative to said housing.

19. The vehicle seat of claim 11 wherein said polymeric material is an injected-molded plastic material.

20. The vehicle seat of claim 11 wherein said polymeric material is nylon.

21. A linear seat recliner apparatus for controllably adjusting the angular position of a seat back relative to a seat base, comprising:

a drive mechanism;

a driven mechanism including a recliner rod adapted to be coupled to one of the seat back and seat base; and a transmission assembly operably interconnecting said drive mechanism and said driven mechanism, said transmission assembly including a gear retainer assembly and a mounting assembly;

said gear retainer assembly including a helical nut gear, a thrust bearing, a doubler plate and a gear housing formed of a polymeric material, said gear housing including a drive mechanism passage, a driven mechanism passage, and a gear cavity, said drive mechanism passage having said drive mechanism disposed therein and extending transverse to said driven mechanism passage, said driven mechanism passage having said driven mechanism disposed therein, said gear cavity communicating with said drive mechanism passage and said driven mechanism passage, said helical gear nut disposed in said gear cavity in operative engagement with said drive mechanism and said driven mechanism, said thrust bearing operatively engaging said helical nut gear, said doubler plate operatively engaging said thrust bearing, said first and second plates compressing said doubler plate against said thrust bearing to limit play within the transmission assembly during operation; and said mounting assembly including a second plate nesting within a first plate and securing said gear retainer assembly therebetween, each of said first and second plates having a central portion and a pair of legs extending from said central portion for aligning said first and second plates, said first plate coupled to said second plate to define a first cavity between said central portions of said first and second plates, said first cavity receiving said gear housing, said mounting assembly coupling said gear retainer assembly to the other of the seat back and seat base.

22. The linear seat recliner apparatus of claim 21 wherein said helical nut gear includes a helical gear on an outer surface thereof and a thread on an inner surface thereof, said driven mechanism includes a rod having a threaded segment extending into said driven mechanism passage and into operative engagement with said inner diameter of said helical nut gear, said drive mechanism including a second rod having a worm gear received in said driven mechanism passage, said worm gear in meshing engagement with said outer surface of said helical nut gear to rotate said helical gear when said drive mechanism is rotated.

23. The linear seat recliner apparatus of claim 21 wherein said gear housing includes a side face and a recess extending inwardly from said side face, said recess bounded by a pair of ledges, said doubler plate disposed in said recess between said pair of ledges.

24. A vehicle seat comprising;

a seat base;

a seat back coupled for pivotable movement relative to the seat base, and a linear seat recliner including a drive mechanism, a driven mechanism, and a transmission assembly, said driven mechanism including a recliner rod adapted to be coupled to one of the seat back and seat base, said transmission assembly operably interconnecting said drive mechanism and said driven mechanism, said transmission assembly including a gear retainer assembly and a mounting assembly;

said gear retainer assembly including a helical nut gear, a thrust bearing, a doubler plate and a gear housing formed of a polymeric material, said gear housing including a drive mechanism passage, a driven mechanism passage, and a gear cavity, said drive mechanism passage having said drive mechanism disposed therein and extending transverse to said driven mechanism passage, said driven mechanism passage having said driven mechanism disposed therein, said gear cavity communicating with said drive mechanism passage and said driven mechanism passage, said helical gear nut disposed in said gear cavity in operative engagement with said drive mechanism and said driven mechanism, said thrust bearing operatively engaging said helical nut gear, said doubler plate operatively engaging said thrust bearing, said first and second plates compressing said doubler plate against said thrust bearing to limit play within the transmission assembly during operation; and said mounting assembly including a second plate nesting within a first plate and securing said gear retainer assembly therebetween, each of said first and second plates having a central portion and a pair of legs extending from said central portion for aligning said first and second plates, said first plate coupled to said second plate to define a first cavity between said central portions of said first and second plates, said first cavity receiving said gear housing, said mounting assembly coupling said gear retainer assembly to the other of the seat back and seat base.

25. The vehicle seat of claim 24 wherein said helical nut gear includes a helical gear on an outer surface thereof and a thread on an inner surface thereof, said driven mechanism includes a rod having a threaded segment extending into said driven mechanism passage and into operative engagement with said inner diameter of said helical nut gear, said drive mechanism including a second rod having a worm gear received in said driven mechanism passage, said worm gear in meshing engagement with said outer surface of said helical nut gear to rotate said helical gear when said drive mechanism is rotated.

26. The vehicle seat of claim 24 wherein said gear housing includes a side face and a recess extending inwardly from said side face, said recess bounded by a pair of ledges, said doubler plate disposed in said recess between said pair of ledges.

* * * * *